Nov. 17, 1964     KENZABURO KITAMURA     3,157,392
SPRING APPARATUS FOR THE SUSPENSION OF VEHICLES
Filed May 3, 1962                        4 Sheets-Sheet 1

INVENTOR
KENZABURO KITAMURA
BY *Linton and Linton*
ATTORNEYS

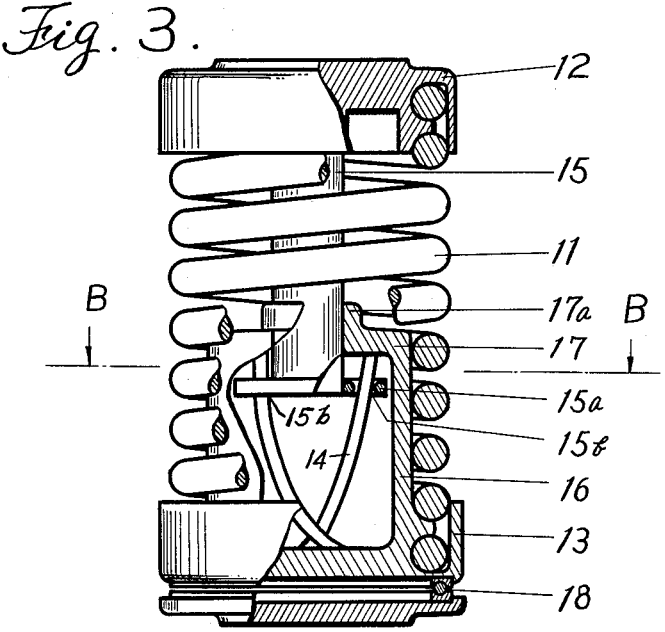
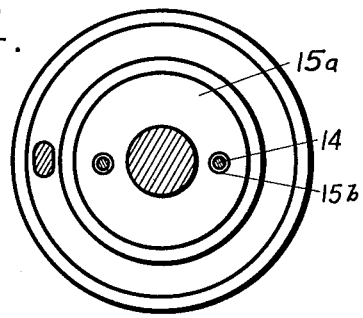

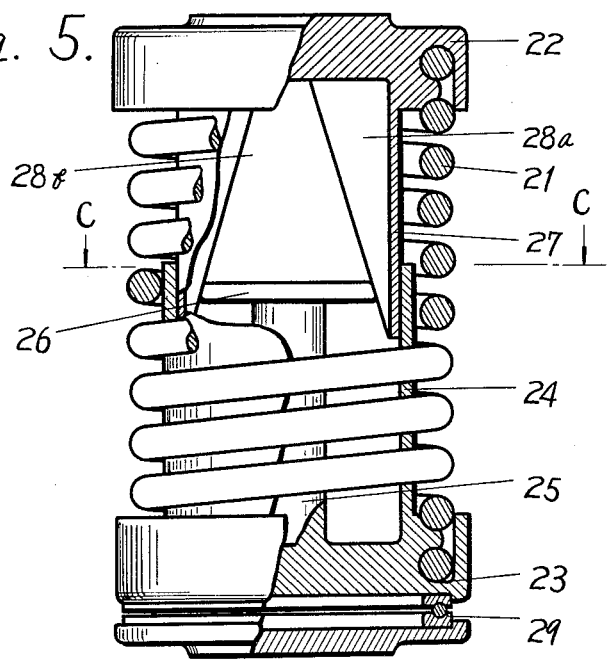
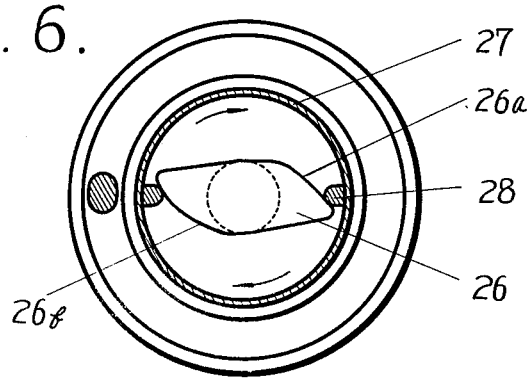

Nov. 17, 1964 KENZABURO KITAMURA 3,157,392
SPRING APPARATUS FOR THE SUSPENSION OF VEHICLES
Filed May 3, 1962 4 Sheets-Sheet 4
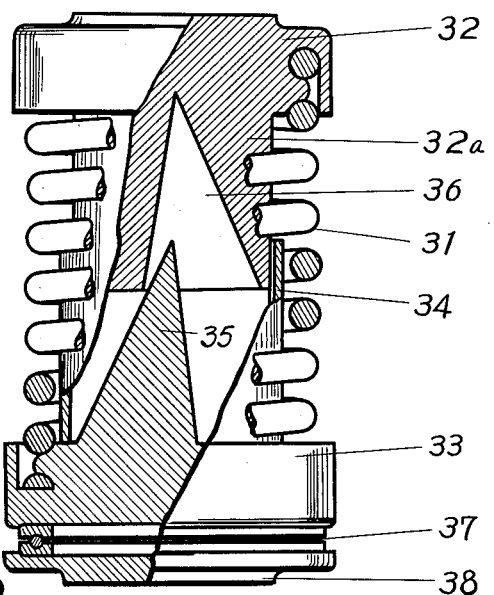
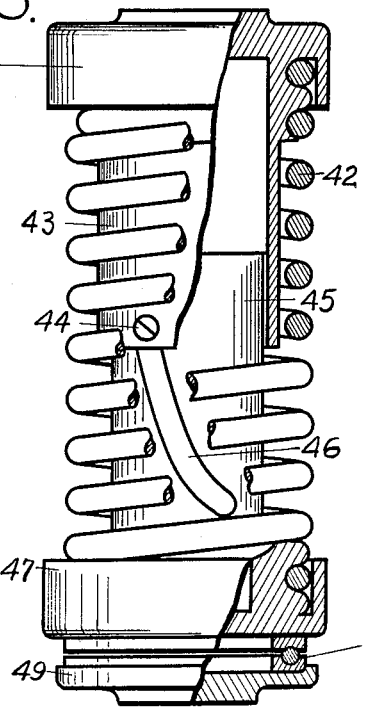
INVENTOR
KENZABURO KITAMURA
BY Linton and Linton
ATTORNEYS

United States Patent Office 3,157,392
Patented Nov. 17, 1964

3,157,392
SPRING APPARATUS FOR THE SUSPENSION
OF VEHICLES
Kenzaburo Kitamura, 38 Fukakusainarinakano-cho,
Fushimi-ku, Kyoto, Japan
Filed May 3, 1962, Ser. No. 192,167
1 Claim. (Cl. 267—1)

This invention relates to the spring apparatus for vehicles and especially automobiles.

Principal object of this invention is to modify a coil spring by changing the spring constant and thereby the natural frequency of vibration is kept constant at all times irrespective of magnitude of load and the best riding condition can be obtained. At the same time it is one important object to simplify the construction as much as possible in order to decrease the manufacturing cost.

Figure 1:
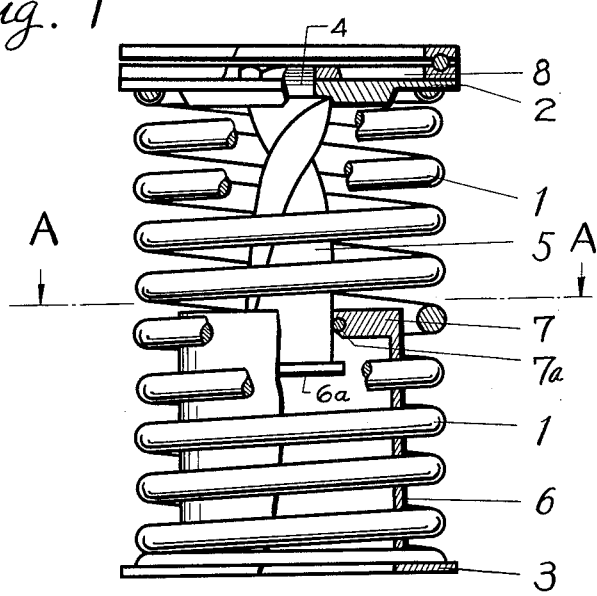
Figure 2:
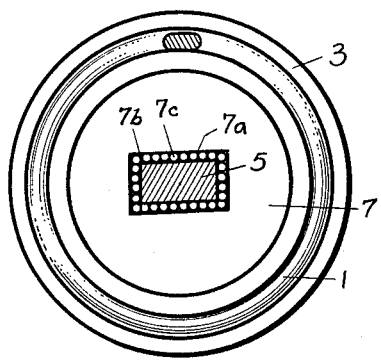

Further objects of the invention will be in part obvious and in part pointed out in the following detailed description of the accompanying drawings, in which:

FIG. 1 is a longitudinal view of a spring assembly partly broken away and provided with a non-linear twisted guiding plate located centrally for effecting the movement of the coil spring in the twisted direction thereof. FIGURE 2 is a longitudinal sectional view taken along the line A—A in FIGURE 1. FIGURE 3 is a longitudinal sectional view of a second form of spring assembly also partly broken away and of the type in which movement in twisted direction of the coil spring is effected by combining two guiding rods and the lower flange of a connecting rod interengaged with said two guiding rods. FIGURE 4 is a sectional view taken along line B—B of FIGURE 3. FIGURE 5 is a longitudinal sectional view of a third form of spring assembly partly broken away and of the type in which the movement in the twisted direction of the coil spring is effected by combining a cam arm and a right angled triangular wedge plate. FIGURE 6 is a sectional view along the line C—C in FIGURE 5.

FIGURE 7 is a longitudinal sectional view of a fourth form of spring assembly partly broken away and of the type in which movement in the twisted direction of the coil spring is effected by the fact that the base plate has an irregular conical protrusion thereon and the top body has an irregular conical recess corresponding to said irregular conical protrusion disposed eccentric under a no load condition of the coil spring. FIGURE 8 is a longitudinal sectional view of a fifth form of coil spring assembly partly broken away in which movement in the twisted direction of the coil spring is effected by the fact that two cylinders each having a different diameter are provided with one having a non-linear sliding groove in which is inserted after sliding a guiding roll attached to the other cylinder.

FIG. 9 is an enlarged perspective view of a guiding roller.

Hitherto, springs for suspending automobiles have used mainly metallic springs, but in most of these metallic springs, amount of deflection is increased in direct proportion to increase of load and spring constant is always constant. Namely load characteristic is of the straight type and belongs to the so-called straight line type spring.

Fixed spring constant means that vibration of spring is decreased in accordance with increase of load, i.e. when load is small vibration is fractionally, and when load is great, automobile vibrates greatly. Thus when vibration is varied according to magnitude of load, in large cars in which load variation is great comfortable riding can not be expected. Therefore, a spring having a constant frequency of vibration (non-linear spring) is required, and recently in order to meet this requirement an air spring has been used, but construction of an air spring is complicated and expensive and maintenance and repair is difficult and needs a large area, air compressor and tank and the like.

In the non-linear spring hitherto used, there are unequal pitch spring, auxiliary spring and the like, but in all of them, spring action is partly lost temporarily on loading or when being idle and the like and it results in having dead load and when there is no suitable deflection (stroke of shock absorbing) it is difficult to obtain high non-linear characteristic.

In this invention, use of spring in the past has been improved basically. The force for deflecting spring (compressive force) being divided into the directions of deflection and of torsion, this compressive force twists the spring and changes the spring rate and thus spring constant is varied automatically and in linear type. Construction is very simple and manufacturing cost thereof is somewhat higher than a spring only but it is very cheap as compared with an air spring and the like.

Briefly speaking, spring action in this invention makes a metallic spring approach that of an air spring. When the spring according to this invention is used for cars, a great variation of car construction is not needed as in the case of an air spring. If this spring is designed at first such that car vibration may be kept constant, very comfortable riding is always obtained irrespective of load variation.

Referring to the attached drawing, five embodiments of this invention will be explained successively. In FIGURE 1, the upper end of the coil spring 1 is fixed to the back side of the top plate 2, and the lower end thereof to the upper face of the bottom plate 3. Upper end of the twisted guiding plate 5 is fixed and suspended at the center of top plate 2.

Cylindrical supporter 6 extends upwards from the bottom plate 3 inside coil spring 1 and is provided with a plate 7 integral therewith having a rectangular hole 7a at its center for receiving said twisted guiding plate 5 and a recess 7b surrounding said hole with ball bearings 7c positioned in said recess with twisted guiding plate 5 sliding along said ball bearings. Said hole is formed as rectangular corresponding to a section of guiding plate. Said twisted guiding plate 5 extends downwards passing through the hole 7a and has a flange at its lower end. Thrust bearing 8 is arranged on the top plate 2. In this apparatus, when load is applied on said bearing 8, twisted guiding plate 5 comes down rotating guided by the hole 7a, following in twisted direction, accordingly, the top plate 2 fixed to it also comes down following the twist of twisted guiding plate 5. In this way, coil spring 1 moves vertically and such that it is not in proportion to deflection resulting in variation of spring constant.

In FIGURE 3 coil spring 11 is fixed at its upper end to the lower face of the top plate 12 and at its lower end to the upper face of the bottom plate 13. The bottom plate 13 extends upwards and has a cylindrical sleeve 16 situated inside the coil spring 11, and the upper end thereof is closed by the top plate 17 having a central circular hole 17a through which extends downwards the connecting rod 15 fixed to the center of the back face of the top plate 12, having a flange 15a at its lower end. Flange 15a has a pair of holes 15b drilled diametrically opposite, passing through these holes are a pair of guiding rods 14 curved in same non-linear direction and are fixed to the bottom plate 13 at their lower ends. Thrust bearing 18 receives bottom plate 13.

Now, in this apparatus, when load is applied on the top plate 12, connecting rod 15 comes down, and the lower end flange 15a comes down, then curved non-linear guiding rod 14 is guided by the hole 15b, top plate 12 is rotated and coil spring 11 is twisted in non-linear type.

In FIGURE 5, coil spring 21 is fixed to the back side of the top plate 22 at its upper end and to the upper end of the bottom plate 23 at its lower end. In the center of the bottom plate is extended a cylindrical sleeve 24 situated inside the coil spring and a supporting column 25 extends upwards at its center.

Arm 26 having cams arranged opposite in diameter is arranged at the upper end of the supporting column 25. Cams 26a, 26b are provided at both ends of arm 26, situated in diametrically opposed relation, and are in contact with the oblique side of the right-angled triangular wedge 28 integral with the top plate 22. Cylindrical body 27 integral with the top plate 22 is placed inside the cylindrical sleeve 24 and has a pair of right-angled or similar shaped wedges 28a, 28b integral with it and in diametrically opposed relation. These right-angled triangular wedge pieces have their base side upwards and each oblique side being the inner side and always in contact with cam faces 26a, 26b. Thrust bearing 29 is arranged below the bottom plate 23. In this apparatus, when load is applied on the top plate 22, top plate is lowered, coil spring 21 is compressed and at the same time it is compressed in axial direction of spring.

Namely, at the same time when the top plate 22 comes down, right triangular wedges 28 come down, whose oblique sides press non-linear cam faces 26a, 26b and rotate cam 26 in the direction as shown by arrow, so that the bottom plate 23 is rotated resulting in the progressed twisting of the lower end of the coil spring 21 fixed to the bottom plate 23.

In FIGURE 7, coil spring 31 is fixed to the back face of the top plate 32 at its upper end and to the upper face of the bottom plate 33 at its lower end. The bottom plate 33 is placed on the ball bearing 37, and has a cylindrical sleeve 34 extended upwards therefrom. Coil spring 31 is placed outside the bottom plate 33 which has the upwardly extending eccentric conical body 35 situated eccentrically. Boss 32a is extended from the lower face of the top plate 32 and the outer face thereof is placed inside the coil 31 and cylindical sleeve 34. Irregular conical recess 36 is provided eccentrically to the center of this boss, and when there is no load, it is placed in diametrically opposed direction to said irregular conical body 35 and a part of it is in contact.

In FIGURE 8, upper spring top plate 41 and upper cylindrical body 43 are made integral. Said cylindrical body 43 has a guiding roller 44 extending inside groove 46. Upper end of coil spring 42 is fixed to the back side of the top plate.

Lower spring seat 47 and lower cylindrical body 45 being constructed in one body, said lower cylindrical body 45 has a crescent-shaped sliding groove 46 formed therein. Lower cylindrical body 45 is slidable in the upper cylindrical body 43, the lower end of the coil spring 42 is fixed to the lower spring seat 47 which is placed upon the thrust bearing 48 attached to the base plate 49.

In this type of apparatus, when the spring 2 is compressed, guiding roll 44 slides in the sliding groove 46 pressing it. Thereby, lower cylindrical body 45 and lower spring seat 47 rotate upon the thrust bearing 48 and therewith coil spring 42 is subjected to twisting resulting in variation of spring constant.

Further, in each of these five examples described above spring constant may be made non-linear by making the form of the guide twisted such that it will not be in proportion to deflection. Various characteristics obtained by applying said embodiment of this invention are as follows:

(a) It becomes harder as deflection increases (spring constant increases) and becomes non-linear spring.

(b) Comfortable riding is kept from no passenger to full passengers irrespective of load variation.

(c) On a steep curve, the spring becomes hard, inclination of car is small and stability is great.

(d) Owing to non-linear type, there is no risk of resonance.

(e) Construction is simple and space is saved.

(f) It can be used with no appreciable remodeling of car construction.

(g) It can be applied simply to various kinds of cars including large type and small one.

(h) Non-linear characteristic of the spring may be varied freely according to the form of curve of non-linear guide.

(i) Manufacturing cost is low.

(j) It is more economical by constructing one body with shock absorber operating up and down twisting.

What I claim is:

An improvement in coil springs comprising a base plate, a top plate, a coil spring having one end fixed to said base plate and the opposite end fixed to said top plate, a cylinder fixedly mounted on said base plate within said coil spring and having a rectangular opening in the head thereof, said cylinder head having a recess surrounding said rectangular opening, ball bearings being positioned in said cylinder head recess, a twisted guide plate fixedly mounted on and extending from said top plate through said head opening over said ball bearings for being rotated thereby upon movement of said guide plate through said head opening and a thrust bearing mounted on said top plate.

References Cited in the file of this patent
UNITED STATES PATENTS

| | | |
|---|---|---|
| 706,306 | Ewart | Aug. 5, 1902 |
| 1,025,388 | Finnell et al. | May 7, 1912 |
| 1,894,717 | Sproul | Jan. 17, 1933 |
| 2,000,905 | Rockefeller | May 14, 1935 |
| 2,162,342 | Anderson | June 13, 1939 |
| 2,637,875 | Hess | May 12, 1953 |
| 2,780,457 | Larson | Feb. 5, 1957 |
| 2,807,458 | Stephenson | Sept. 24, 1957 |